United States Patent
Flake

(10) Patent No.: US 7,730,256 B2
(45) Date of Patent: Jun. 1, 2010

(54) DUAL WORK QUEUE DISK DRIVE CONTROLLER

(75) Inventor: Lance Leslie Flake, Longmont, CO (US)

(73) Assignee: Broadcom Corporation, Irvine, CA (US)

( * ) Notice: Subject to any disclaimer, the term of this patent is extended or adjusted under 35 U.S.C. 154(b) by 653 days.

(21) Appl. No.: 11/210,487

(22) Filed: Aug. 22, 2005

(65) Prior Publication Data

US 2007/0043902 A1  Feb. 22, 2007

(51) Int. Cl.
G06F 12/00 (2006.01)

(52) U.S. Cl. .................. 711/113; 711/112; 711/154; 710/52; 710/54

(58) Field of Classification Search .................. 711/100, 711/111–113, 154; 710/52, 54; 360/270
See application file for complete search history.

(56) References Cited

U.S. PATENT DOCUMENTS

| | | | |
|---|---|---|---|
| 5,729,718 A | 3/1998 | Au | |
| 5,937,426 A * | 8/1999 | Sokolov | 711/113 |
| 5,991,825 A | 11/1999 | Ng | |
| 6,219,750 B1 * | 4/2001 | Kanamaru et al. | 711/113 |
| 6,418,510 B1 | 7/2002 | Lamberts | |
| 6,567,886 B1 * | 5/2003 | Saitoh et al. | 711/111 |
| 6,799,228 B2 * | 9/2004 | Mamiya et al. | 710/40 |
| 6,925,526 B2 * | 8/2005 | Hall | 711/113 |
| 7,159,073 B2 * | 1/2007 | Longo et al. | 711/113 |
| 2003/0110357 A1 * | 6/2003 | Nguyen et al. | 711/136 |

* cited by examiner

Primary Examiner—Jasmine Song
(74) Attorney, Agent, or Firm—McAndrews, Held & Malloy, Ltd.

(57) ABSTRACT

Herein described is at least a method and system for improving the performance of a disk drive. A cache work queue and a disk work queue operate together as a dual work queue to facilitate efficient processing of one or more read/write operations performed by the disk drive. In a representative embodiment, the disk drive controller comprises a host interface, a cache buffer, and a disk drive media interface. The disk drive controller comprises the necessary circuitry to execute one or more host commands provided by a host computer. Further, the disk drive controller may facilitate the generation of the cache work queue and the disk work queue. The disk drive controller executes one or more host commands that are received through the host interface such that the cache work queue and disk work queue are employed when a read or write operation is performed.

21 Claims, 3 Drawing Sheets

DUAL WORK QUEUE DISK DRIVE CONTROLLER

RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When performing a read or write operation on a disk drive, a variety of methods have been employed to reduce total data access time. One method, known as command queue reordering, reorders a command sequence that is received from a host computer into an execution sequence for a disk drive. Commands may be temporarily held in a command queue, where they may be reordered. Each command in the command queue contains an instruction for the disk drive that facilitates a read or write operation starting from a particular logical block address (LBA) on the disk. These commands may be uniquely identified by a label or tag, allowing them to be executed in a sequence different from that in which they arrive at the host computer. The idea behind reordering such commands is to minimize the path length that the read/write mechanical actuator or transducer must travel.

Another method to perform command queue reordering utilizes what is known as a rotational positioning optimization (RPO) algorithm. The RPO algorithm may utilize seek time and rotational latency when reordering the command queue. The total access time for a read or write command in the current command queue is computed with respect to the ending LBA of the last executed command, and the command having the shortest access time is moved to the front of the queue.

Yet another more advanced RPO algorithm may be used that considers the state of cache memory, in addition to the command queue. The more advanced RPO algorithm utilizes a cost function for not storing the block in the cache memory and an analogous cost function for storing the new data block into the cache memory. The above referenced RPO schemes try to optimize disk performance for queued commands, utilizing a host-centric approach.

Unfortunately, each of the previous schemes relies on a host-command oriented approach that employs a single work queue. This approach limits the effectiveness for tracking non-host-command work that occurs between the cache memory and the disk drive.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention improve the performance of read and write operations of a data storage device by way of using a dual work queue. The various aspects are substantially as shown in and/or described in connection with at least one of the following figures, as set forth more completely in the claims.

These and other advantages, aspects, and novel features of the present invention, as well as details of illustrated embodiments thereof, will be more fully understood from the following description and drawings.

DETAILED DESCRIPTION OF THE INVENTION

Figure 1:
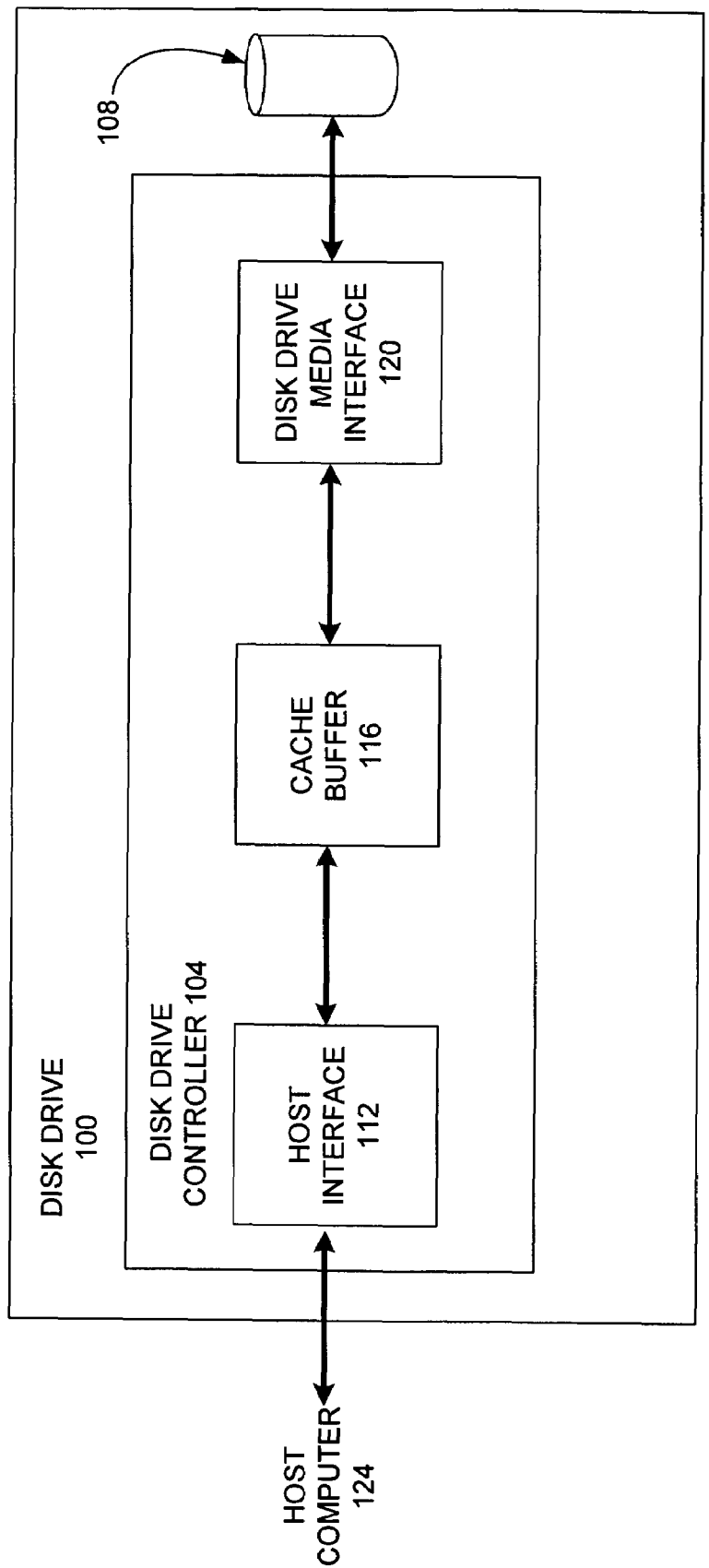
FIG. 1 is a functional block diagram illustrating a system used for improving or optimizing the performance of read/write operations of a disk drive, in accordance with an embodiment of the invention.

Herein described is at least a method and system to provide improved performance of a data storage device such as a disk drive by way of using dual work queues. As a result of implementing the various aspects of the invention, performance is improved because the processing of read or write operations are more efficiently performed. This results in reducing access time when a read or write operation is performed.

Various aspects of the invention facilitate performing a read or write operation by efficiently processing and/or transferring one or more blocks of data between a host computer and a disk drive. Various aspects of the invention optimize data block transfers between the host computer and the disk drive by utilizing a memory to store one or more spans of data. The memory may be referred to as a cache buffer, which may be used as an intermediary storage facility for implementing what will be referred to as a "cache work queue". The cache work queue may comprise work entries that specify data that is transferred between the cache buffer and a disk drive media interface. The disk drive media interface may comprise a read/write mechanical actuator mechanism and any necessary electronics for controlling the operation of the actuator mechanism of a disk drive. The mechanical actuator mechanism comprises a read/write head. The cache work queue may utilize the cache buffer for storing a list of work entries related to reading data from or writing data into a disk drive media. A "disk work queue" may be used to organize work entries related to read/write activities associated with a disk drive actuator mechanism and its disk drive media. The cache work queue and the disk work queue function to implement a dual work queue.

A cache work queue may function to decouple host related work activity from disk drive related work activity. For example, one or more host commands may be categorized or separated into one or more cache related work entries or one or more disk work entries. Cache related policy decisions are made with an objective for optimizing cache performance while disk drive policy decisions are made with an objective for optimizing disk efficiency at the disk drive media interface level. The current state of the cache work queue and the state of its associated cache buffer is considered when cache related policy decisions are made. The current state of the disk work queue and the current position of the read/write head (disk drive actuator mechanism) is considered when disk drive policy decisions are made. In a representative embodiment, as will be shown in FIG. 1, the cache buffer is located within the disk drive. Aspects of the invention may evaluate and/or assess the presence of relevant data in the cache buffer when a host computer executes one or more host commands. The cache work queue may utilize the data stored in the cache buffer. For example, relevant data previously stored in the cache buffer may be utilized when a write operation is performed, and the cache work queue may utilize data that is readily accessible from the cache buffer. Likewise, the relevant data previously stored in the cache buffer may be utilized when a read operation is performed, and the cache work queue may rely on the contents of the cache buffer. The various aspects of the invention may facilitate processing of outstanding data spans of logical block addresses (LBAs) by way of using the cache work queue. The cache work queue comprises a sequence of cache work entries. Each cache work entry comprises one or more fields.

While the cache work queue provides an organized list of work entries used for processing data between a cache buffer and a read/write disk drive actuator mechanism of a disk drive, the disk work queue may be subsequently used to perform work related to physically reading/writing data blocks onto a disk drive media of the disk drive. The disk work queue provides an ordered sequence of disk work entries for physically writing data onto the disk drive media using the read/write disk drive actuator mechanism. Likewise, the disk work queue may provide an ordered sequence of disk work entries for physically reading data from the disk drive media of the disk drive, using the read/write disk drive actuator mechanism.

Overall, the various aspects of the invention provide an optimized or improved method of performing a read or a write operation by assessing the presence of one or more data spans stored within a cache buffer. After assessing the presence of the one or more data spans within the cache buffer, a cache work queue is developed such that one or more data blocks may be optimally transferred between a host computer, the cache buffer, and a disk drive media. The cache work queue operates in conjunction with a disk work queue to optimize processing of read/write requests from the host computer. As a result of using dual work queues, a transfer of a group of data blocks from a host interface may not have any correlation to any data blocks that are transferred between the cache buffer and the disk drive. The previously mentioned cache work queue and disk work queue are used to implement the dual work queue. The functional structure of a work queue is described in FIG. 3. Use of the cache work queue and disk work queue provides a management method that optimally processes a read or write operation. Various aspects of the invention provide a method of work specialization that is implemented by utilizing the dual work queues. The various aspects of the invention separate work to be performed, as requested by a host computer, into two separate work queues. As a result, data transfer decisions from a host to the disk drive media are made more efficiently, based on the current states of the individual work queues.

FIG. 1 is a functional block diagram illustrating a system used for improving or optimizing the performance of read/write operations of a disk drive 100, in accordance with an embodiment of the invention. In this representative embodiment, the disk drive 100 comprises a disk drive controller 104 that communicates to a host computer 124 and to a disk drive media 108. The disk drive controller 104 comprises a host interface 112, a cache buffer 116, and a disk drive media interface 120. The disk drive controller 104 may comprise one or more logic circuitries or electronics for controlling and/or processing data transfers between the host computer 124 and the disk drive media 108. The disk drive controller 104 may process data transfers in response to one or more host commands provided by the host computer 124, for example. A host command may comprise a read or write command, for example. A typical read or write command may cover a span of logical blocks of data, beginning at a logical block address (LBA). Each logical block of data contains a certain number of data bytes. In a representative embodiment, a logical block of data comprises 512 bytes. In a representative embodiment, the host interface may comprise any type of connector that connects the disk drive 100 to a data bus. The data bus may comprise a 32 bit or 64 bit data bus, for example. Data may be transferred between the host interface 112 to the cache buffer 116 as illustrated in FIG. 1. Likewise, data may be transferred between the cache buffer 116 to the disk drive media interface 120. The disk drive media interface 120 comprises a mechanical actuator mechanism and the necessary circuitry or electronics for controlling the operation of the actuator mechanism. The actuator mechanism may comprise a transducer and a read/write head for physically interacting with the surface(s) of the disk drive media 108. A data transfer operation out of the cache buffer 116 through the host interface 112 signifies a read operation while a data transfer into the cache buffer 116 from the host interface 112 signifies a write operation. A data transfer operation from the cache buffer 116 into the disk drive media interface 120 signifies a write operation while a data transfer operation from the disk drive media interface 120 into the cache buffer 116 signifies a read operation. The data blocks that are transferred into the disk drive media interface 120 may be specified by using logical block addresses (LBAs). By way of using a dual work queue approach, the various aspects of the invention facilitate implementing an optimal sequence or order in which one or more data blocks are transferred between the host interface 112, the cache buffer 116, the disk drive media interface 120, and the disk drive media 108. Various aspects of the invention may be used to track data transfers into and out of the cache buffer 116 using the cache work queue. Similarly, transfers into and out of the disk drive media 108 may be tracked using the disk work queue.

Figure 2:
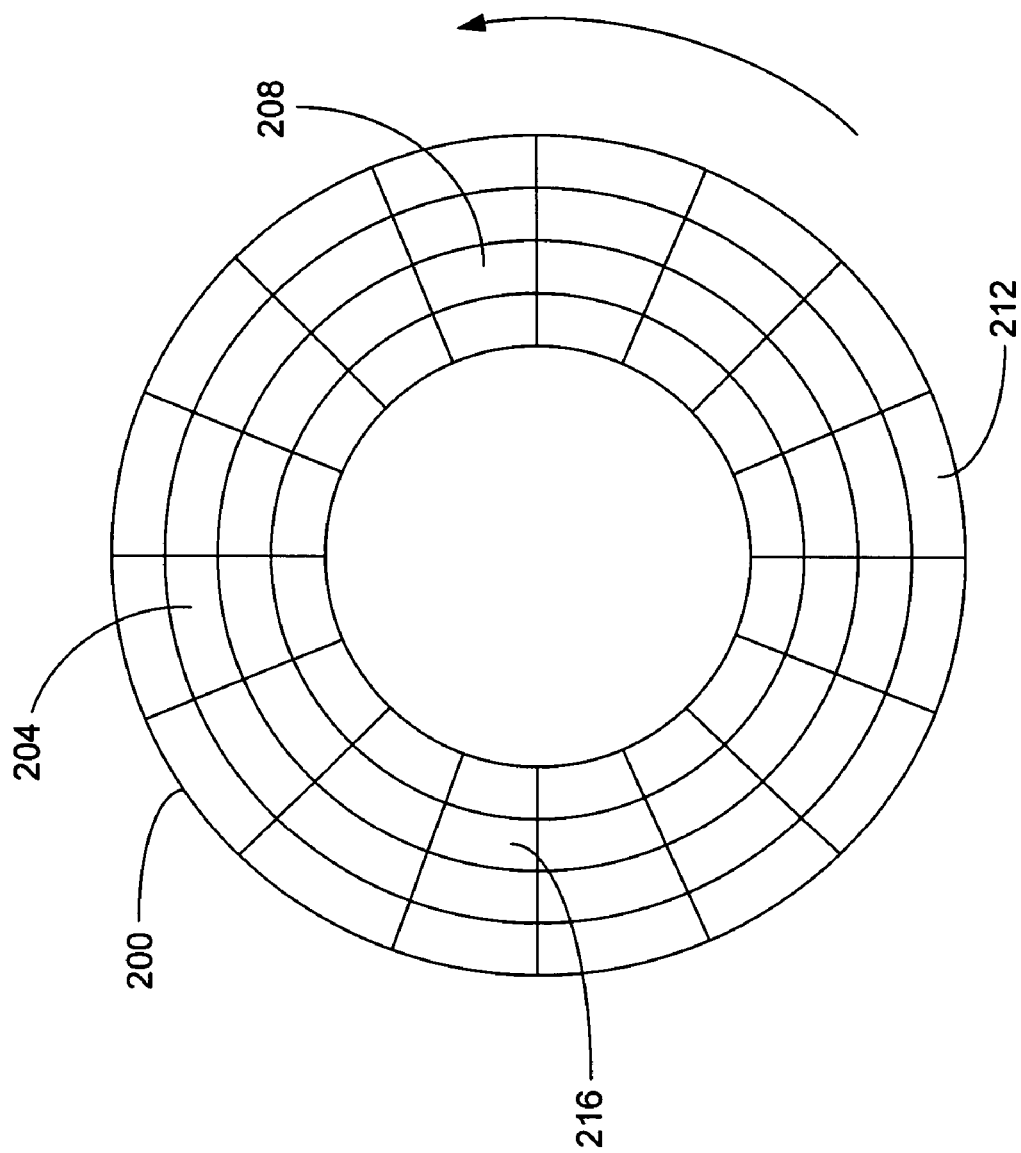
FIG. 2 provides an illustration of a surface of a disk drive media that is used by the system described in FIG. 1, in accordance with an embodiment of the invention.

FIG. 2 provides an illustration of a surface 200 of a disk drive media that is used by the system described in FIG. 1, in accordance with an embodiment of the invention. In a representative embodiment, the surface 200 comprises four concentric data tracks in which each data track comprises a total of sixteen data sectors. In general, the surface 200 may comprise any number of concentric data tracks and any number of data sectors per data track. A disk drive may comprise one or more such surfaces. Data sectors 208, 216 are located in a common data track while data sectors 204, 212 are located in different data tracks. In response to one or more host commands provided by a host computer, the disk controller described in relation to FIG. 1 facilitates proper positioning of the read/write head on any one of the four data tracks illustrated in FIG. 2. The circular surface 200 rotates around its central axis such that one or more data sectors in a data track may be sequentially written into or read from. As may be easily understood, the time required for moving the read/write head from one track to another track as well as the time required for the surface 200 to rotate from one data sector to the next data sector contribute to the overall access time required when performing a read or a write operation.

Figure 3:
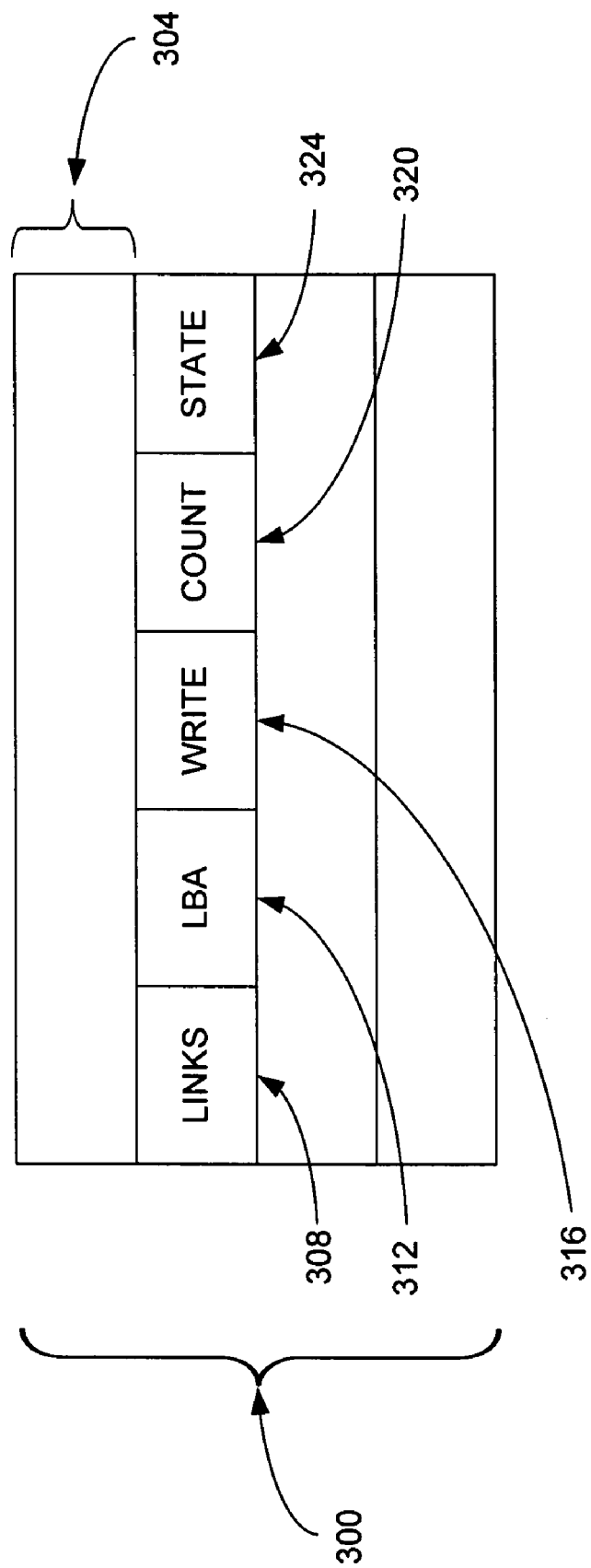
FIG. 3 is a block diagram illustrating one or more fields of an entry in a work queue, in accordance with an embodiment of the invention.

FIG. 3 is a block diagram illustrating one or more fields of an entry in a work queue 300, in accordance with an embodiment of the invention. As shown, each of the one or more entries 304 of the work queue 300 may comprise one or more fields. Each entry describes work that is to be performed for a logical data block span starting at the LBA value designated in the LBA field 312. An entry in a work queue describes a contiguous number of data blocks used in a read or write operation, starting from a particular LBA. As shown, the links field 308 comprises a pointer to the next or previous entry. In this representative embodiment, the links field 308 is used to implement a data structure commonly referred to as a doubly-linked list. A write flag field 316 may be used to indicate whether a write or a read is to be performed for an entry in the work queue 300. The count field 320 provides the number of contiguous data blocks associated with the starting LBA specified in the LBA field 312. The state field 324 is used to determine the type of work associated with an entry of the work queue. The type of work performed may differ depending on whether the work queue is a cache work queue or a disk work queue. The values associated with the state field 324 may specify the following states in a work queue: 1) host-cache, 2) host-command, 3) cache-command, 4) host-disk, and 5) cache-disk. The host-cache state refers to a future transfer solely between the host and the cache. The host-command and host-disk states refer to host originated work that also involves the disk drive media. The host-command state is used as an initial state in which the disk work queue has no corresponding work yet to be performed. When the disk work queue reflects this future transfer, the cache work queue state changes to the host-disk state. The cache-command and cache-disk states refer to non-host work performed only between the cache buffer and the disk drive media. The cache-command describes an initial state that will eventually be reflected in the disk work queue. The cache-disk state refers to a successive state that follows its cache-command state. For a disk work queue, the values associated with the state field 324 may also specify that the work is related to translating a logical block address (LBA) to a cylinder/head/sector location on the disk drive media. In another instance, the state value may specify that one or more algorithms are utilized. In a representative embodiment, a work queue 300 may be stored within the cache buffer described in reference to FIG. 1.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of improving the processing performance of a disk drive comprising:
   generating a first work queue for providing a first ordered sequence of work entries used for processing data between a cache buffer of said disk drive and a read/write disk drive actuator mechanism of said disk drive;
   using said first work queue to track and process a read or write operation, said first work queue utilizing data stored in said cache buffer of said disk drive;
   generating a second work queue for providing a second ordered sequence of work entries for physically reading/writing data from/onto a disk drive media of said disk drive; and
   using said second work queue to process said read or write operation between a disk drive media interface of said disk drive and said disk drive media of said disk drive, said disk drive media interface comprising said read/write mechanical actuator.

2. The method of claim 1 wherein said first work queue is used to process data transferred between said cache buffer and said disk drive media interface.

3. The method of claim 1 wherein one or more entries of said first work queue and/or one or more entries of said second work queue are stored in said cache buffer.

4. The method of claim 1 wherein said disk drive comprises a magnetic hard disk drive.

5. The method of claim 1 wherein each of said first work queue and said second work queue comprises a doubly linked list.

6. The method of claim 1 wherein said first work queue and said second work queue comprise one or more entries, each of said one or more entries comprising one or more fields, wherein a field of said one or more fields specifies a starting logical block address at which data is written into or read from said disk drive.

7. The method of claim 1 wherein each entry of said first ordered sequence and said second ordered sequence of work entries comprises one or more fields, wherein a field of said one or more fields provides a read or write indicator that determines whether a read or write operation is to be performed on said disk drive.

8. The method of claim 1 wherein each entry of said first ordered sequence and said second ordered sequence of work entries comprises one or more fields, wherein a field of said one or more fields specifies the amount of data to be written into or read from said disk drive.

9. The method of claim 1 wherein each entry of said first ordered sequence and said second ordered sequence of work entries comprises one or more fields, wherein a field of said one or more fields comprises data that specifies the type of work to be performed on said disk drive.

10. The method of claim 9 wherein said type of work comprises a) host to cache, b) host command, c) cache-command, d) host to disk, or e) cache to disk.

11. The method of claim 1 wherein said cache buffer is located within a disk drive controller.

12. A disk drive comprising:
   a host interface for receiving host commands;
   a disk drive media interface for reading or writing data onto a disk drive media of said disk drive, said disk drive media interface comprising a mechanical read/write actuator mechanism;
   a disk drive media; and
   a memory for storing data used in said read or write operation, said memory used for storing entries of a first work queue and a second work queue, said first work queue for providing a first ordered sequence of work entries used for processing data between said memory and said mechanical read/write actuator mechanism, said second work queue for providing a second ordered sequence of work entries for physically reading/writing data from/onto said disk drive media.

13. The disk drive of claim 12 wherein said second work queue provides an organized list of said entries for processing data transfers between said disk drive media interface and said disk drive media.

14. The disk drive of claim 12 wherein said disk drive media comprises a surface that rotates around its central axis, said surface configured into one or more concentric tracks, wherein each of said concentric tracks comprises one or more data sectors.

15. The disk drive of claim 12 wherein said host interface communicates to a host computer by way of a data bus.

16. The disk drive of claim 12 wherein said disk drive media interface performs a translation from a logical block address to physical location on said disk drive media.

17. The disk drive of claim 12 wherein said first work queue and said second work queue comprise said entries, each of said entries comprising one or more fields, wherein a field of said one or more fields specifies a starting logical block address at which data is written into or read from said disk drive.

18. The disk drive of claim 12 wherein said first work queue and said second work queue comprise said entries, each of said entries comprising one or more fields, wherein a field of said one or more fields provides a read or write indicator that determines whether a read or write operation is to be performed on said disk drive.

19. The disk drive of claim 12 wherein said first work queue and said second work queue comprise said entries, each of said entries comprising one or more fields, wherein a field of said one or more fields specifies the amount of data to be written into or read from said disk drive.

20. The disk drive of claim 12 wherein said first work queue and said second work queue comprise said entries, each of said entries comprising one or more fields, wherein a field of said one or more fields comprises data that specifies the type of work to be performed on said disk drive.

21. The disk drive of claim 12 wherein a field of an entry of said entries in said second work queue comprises a value that specifies whether the work associated with said second work queue relates to translating a logical block address (LBA) to a cylinder/head/sector location on said disk drive media.

* * * * *